(12) United States Patent
Fuller et al.

(10) Patent No.: US 10,710,794 B2
(45) Date of Patent: *Jul. 14, 2020

(54) RAIL CAR RACK

(71) Applicant: GUARDIAN GLASS, LLC, Auburn Hills, MI (US)

(72) Inventors: Bryan Matthew Fuller, Grand Blanc, MI (US); Maximo Rivera Zapata, Kingsburg, CA (US); Drew Alexander Kirk, Fresno, CA (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,501

(22) Filed: Jun. 4, 2019

(65) Prior Publication Data

US 2019/0283961 A1 Sep. 19, 2019

Related U.S. Application Data

(63) Continuation of application No. 15/805,331, filed on Nov. 7, 2017, now Pat. No. 10,336,528.

(60) Provisional application No. 62/440,680, filed on Dec. 30, 2016.

(51) Int. Cl.
*B65D 85/48* (2006.01)
*B60P 3/00* (2006.01)
*B65D 88/12* (2006.01)

(52) U.S. Cl.
CPC .............. *B65D 85/48* (2013.01); *B60P 3/002* (2013.01); *B65D 88/129* (2013.01)

(58) Field of Classification Search
CPC ........ B65D 85/48; B65D 19/44; B65D 85/46; B65D 85/30; B65D 88/129; B60P 3/002; B65G 49/062; A47F 7/0042; A47F 7/163; A47F 5/10; D06F 57/08; A47B 43/00; A47B 45/00

USPC ... 211/180, 195, 27, 198, 41.14, 41.15, 175; 206/454, 448; 248/166

See application file for complete search history.

(56) References Cited

U.S. PATENT DOCUMENTS

| | | | | |
|---|---|---|---|---|
| 2,116,381 A | * | 5/1938 | Burke | B65D 19/44 206/597 |
| 2,839,198 A | * | 6/1958 | Lefevre | B65D 85/48 211/41.14 |
| 3,244,120 A | | 4/1966 | Taylor | |
| 3,878,942 A | * | 4/1975 | Hansen | B65D 85/48 206/454 |

(Continued)

*Primary Examiner* — Jennifer E. Novosad

(57) ABSTRACT

Racks for shipping loose or packaged glass sheets. A rack includes spaced-apart upright members that taper in thickness such that they are thicker at their lower ends compared to their upper ends. Base members extends outwardly and generally perpendicularly from respective upright members. The base members also taper such that they become thicker moving outwardly from the upright members. An acute or right angle is formed between innermost surfaces of the upright members and uppermost surfaces of the base members. The rack, when used alone, is self-standing as if an L-frame like rack and is arrangeable back-to-back with another rack of the same type to form a mutually-supporting A-frame like rack. The racks are easily loadable onto/removable from rail cars, trucks, and/or the like. Racks include features accommodating forks of a forklift/fork truck, further facilitating their movement.

7 Claims, 18 Drawing Sheets

(56) References Cited

U.S. PATENT DOCUMENTS

Figure 1:
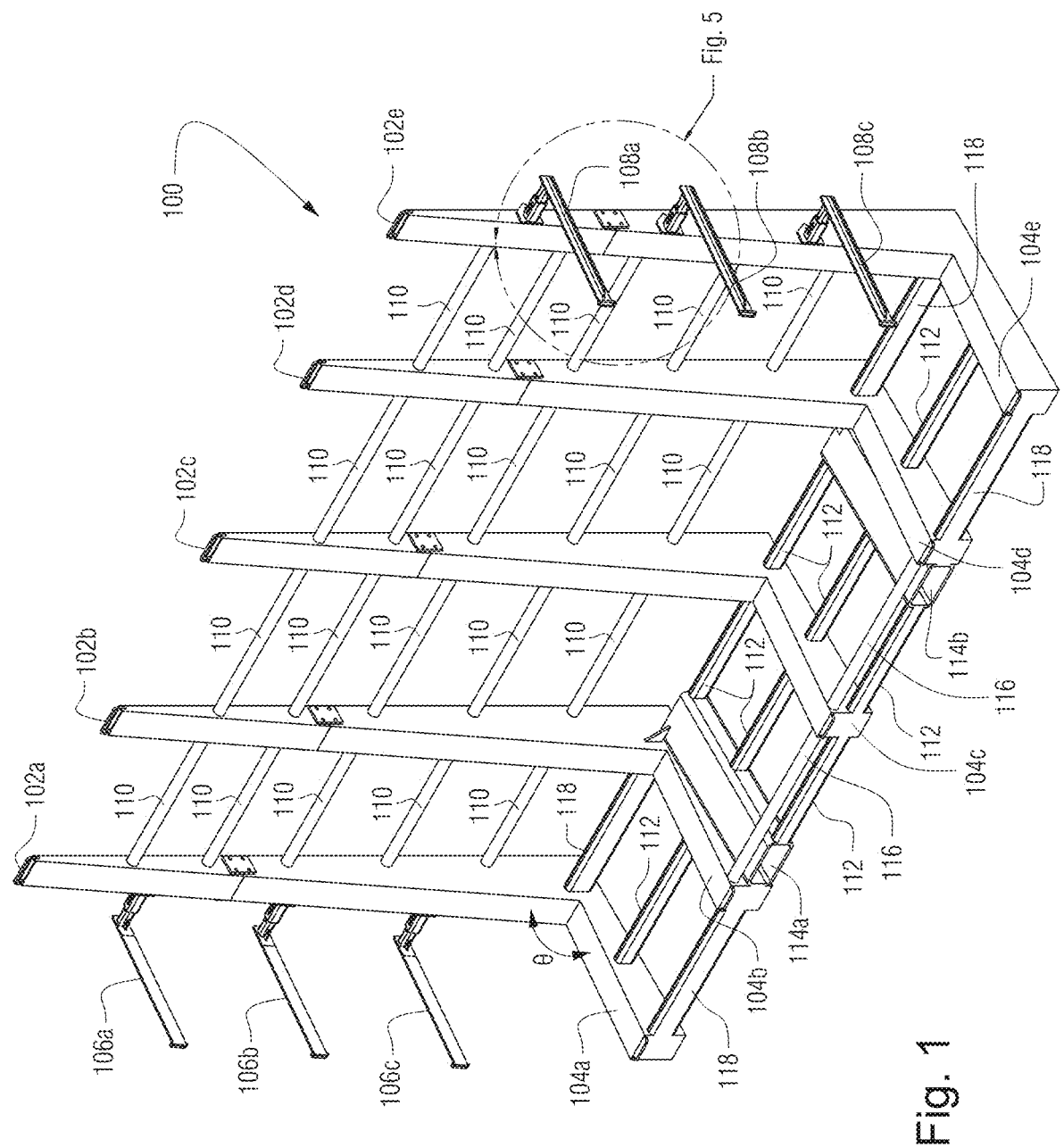

| | | | | |
|---|---|---|---|---|
| 3,913,965 A | * | 10/1975 | Muller | B65G 49/062 294/67.22 |
| 3,955,676 A | * | 5/1976 | Hansen | B65D 85/48 206/451 |
| 4,127,071 A | | 11/1978 | Thomaswick | |
| 4,278,171 A | * | 7/1981 | Millhoan | B65G 49/062 206/451 |
| 4,492,071 A | * | 1/1985 | Gibson | B65G 49/062 206/205 |
| 4,678,170 A | * | 7/1987 | Sampson | B25H 1/00 269/296 |
| 5,085,329 A | * | 2/1992 | Crowell | B65D 85/48 211/195 |
| 5,145,073 A | * | 9/1992 | Kitagawa | B65D 85/48 206/448 |
| 5,379,904 A | * | 1/1995 | Brown | A47F 7/0042 211/175 |
| 5,411,360 A | * | 5/1995 | Hilliker | B60P 1/02 108/53.5 |
| 5,590,435 A | * | 1/1997 | Kostigian | 15/268 |
| 5,906,282 A | * | 5/1999 | Aldrich | B65G 49/062 206/454 |
| 6,073,783 A | * | 6/2000 | Allman | D06F 59/02 211/85.3 |
| 6,077,018 A | * | 6/2000 | Lisec | B65G 49/062 414/269 |
| 6,102,206 A | * | 8/2000 | Pride | B65D 85/48 206/454 |
| 6,170,672 B1 | * | 1/2001 | Boettcher | A47B 81/007 211/13.1 |
| 6,267,345 B1 | * | 7/2001 | Turner | A47B 97/04 248/129 |
| 6,386,376 B1 | * | 5/2002 | Mendoza-Castillo | B65G 49/062 206/454 |
| 6,585,224 B1 | * | 7/2003 | Schmidt | B63H 20/36 108/55.1 |
| 6,626,619 B1 | | 9/2003 | Exnowski et al. | |
| 6,742,663 B2 | * | 6/2004 | Chubb | B65D 19/12 211/41.14 |
| 6,820,752 B2 | * | 11/2004 | Jeskey | B65G 49/062 206/454 |
| 6,910,591 B2 | * | 6/2005 | Knoll | B65G 49/062 211/41.14 |
| 7,264,126 B1 | * | 9/2007 | Bergeron | B65D 85/46 206/454 |
| 7,510,091 B2 | | 3/2009 | Sollers | |
| 7,648,035 B2 | | 1/2010 | Edwards et al. | |
| 8,025,161 B2 | | 9/2011 | Chookang | |
| 8,191,717 B2 | * | 6/2012 | Mantenuto | B65D 19/18 211/41.15 |
| 8,714,369 B2 | * | 5/2014 | Liu | A47F 7/30 211/13.1 |
| 8,726,816 B2 | * | 5/2014 | Servaes | B65D 19/0038 108/55.3 |
| 8,752,716 B2 | * | 6/2014 | Gibson | B65D 85/48 211/175 |
| 8,789,710 B1 | * | 7/2014 | Moore | B62B 1/20 211/41.14 |
| 9,145,083 B2 | | 9/2015 | Samra | |
| 9,428,095 B2 | * | 8/2016 | Belmont | B60P 3/002 |
| 9,463,937 B2 | * | 10/2016 | Piccininno | B65G 49/062 |
| 10,336,528 B2 | * | 7/2019 | Fuller | B65D 88/129 |
| 2007/0272633 A1 | * | 11/2007 | Gardner | B65D 88/129 211/41.15 |
| 2014/0291187 A1 | * | 10/2014 | Servaes | A47F 7/0042 206/454 |
| 2017/0275051 A1 | * | 9/2017 | Bottcher | B65D 19/44 |

* cited by examiner

RAIL CAR RACK

CROSS-REFERENCE TO RELATED APPLICATION

This application is a continuation of U.S. application Ser. No. 15/805,331 filed Nov. 7, 2017, which claims benefit of U.S. Provisional Application Ser. No. 62/440,680 filed Dec. 30, 2016, the entire disclosures of which are hereby incorporated herein by reference in their entireties.

FIELD OF THE INVENTION

Certain example embodiments of this invention relate to racks for shipping loose or packaged glass sheets. More particularly, certain example embodiments of this invention relate to racks for shipping loose or packaged glass sheets, with such racks being removable from the rail cars, trucks, or the like, that may be used to transport them.

BACKGROUND AND SUMMARY

Platforms and racks for storing and shipping glass sheets are known in the art. For example, see U.S. Pat. Nos. 9,145,083; 8,025,161; 7,648,035; 7,510,091; 6,626,619; 6,102,206; 4,127,071; and 3,244,120, the disclosures of which are hereby incorporated herein by reference. The term glass sheets as used herein refers to monolithic glass sheets, laminated glass sheets, flat glass sheets, heat treated glass sheets, annealed glass sheets, coated glass sheets, uncoated glass sheets, and/or any other suitable type of glass sheets.

Some current designs use a fixed A-frame on a modified rail car, or use an intermodal. Current rail cars typically are open-top gondolas that generally need to be loaded by cranes. It will be appreciated, however, that open designs leave sheets unprotected. Customized fixed frames can increase costs and also reduce flexibility. Open designs also may not protect glass sheets to the degree desired and/or needed. The use of cranes can require specialized and dedicated machinery, as well as a significant amount of dedicated space for loading/unloading operations. These issues can be exaggerated as glass sizes increase, e.g., even before current so-called "jumbo lite" sizes are reached.

Thus, it will be appreciated that there is a need in the art for an improved structure for stabilizing and shipping glass sheets, especially when so-called "jumbo" glass sheets are involved. Certain example embodiments address these and/or other concerns.

In certain example embodiments, a rack adapted to hold a plurality of glass sheets is provided. A plurality of upright members are spaced apart from one another, with each of the upright members having upper and lower ends, and with the upright members being thicker at the respective lower ends compared to the respective upper ends and tapering in thickness along a height direction. A plurality of base members extend outwardly and generally perpendicularly from respective upright members, with the base members having a thickness that increases moving outwardly from the upright members so as to form an acute or right angle between innermost surfaces of the upright members and uppermost surfaces of the base members. The rack alone is self-standing as an L-frame rack, and wherein the rack is arrangeable back-to-back with another rack of the same type to form a mutually-supporting A-frame rack.

According to certain example embodiments, first and second tubular members may be provided substantially in line with the base members and on opposing sides of a central axis of the rack, with the first and second tubular members being sized, shaped, and arranged to permit the rack to be moved by receiving forks from a forklift and/or fork truck.

According to certain example embodiments, first and second sets of arms may be provided to the outermost upright members, with the first and second sets of arms being positioned to reduce lateral movement of glass sheets provided to the rack.

In certain example embodiments, a kit is provided. A rack adapted to hold a plurality of glass sheets comprises a plurality of upright members that are spaced apart from one another, with each of the upright members having upper and lower ends, and with the upright members being thicker at the respective lower ends compared to the respective upper ends and tapering in thickness along a height direction; and a plurality of base members extending outwardly and generally perpendicularly from respective upright members, with the base members having a thickness that increases moving outwardly from the upright members so as to form an acute or right angle between innermost surfaces of the upright members and uppermost surfaces of the base members. A plurality of bridges are connectable at lower ends thereof to respective base members of the rack outside an outermost glass sheet provided to the rack, with the bridges being arrangeable generally in parallel with the upright members and having upper ends extending to a height corresponding to upper ends of the upright members when the bridges are connected to the base members. The rack alone may be self-standing as an L-frame rack, and the rack may be arrangeable back-to-back with another rack of the same type to form a mutually-supporting A-frame rack.

According to certain example embodiments, the bridges may be engagable with openings in and/or grooves of the base members of the rack, and/or may be configured to engage with outer lips of the base members of the rack.

According to certain example embodiments, a plurality of spacers are included in the kit, with the spacers being providable between adjacent glass sheets.

Methods of making and/or using racks are also contemplated herein. This includes, for example, moving glass sheets/racks, loading and/or unloading racks, using the kits, etc.

In this regard, in certain example embodiments, a method of moving glass sheets is provided. A rack includes a plurality of upright members that are spaced apart from one another, with each of the upright members having upper and lower ends, and with the upright members being thicker at the respective lower ends compared to the respective upper ends and tapering in thickness along a height direction; a plurality of base members extending outwardly and generally perpendicularly from respective upright members, with the base members having a thickness that increases moving outwardly from the upright members so as to form an acute or right angle between innermost surfaces of the upright members and uppermost surfaces of the base members; and first and second sets of arms provided to the outermost upright members, with the first and second sets of arms being provided to reduce lateral movement of glass sheets provided to the rack. Glass sheets are loaded onto the rack. A plurality of bridges are placed on the rack, with the bridges at lower ends thereof engaging with respective base members of the rack outside an outermost glass sheet provided to the rack, and with the bridges, once placed, being generally parallel with the upright members and having upper ends extending to a height corresponding to upper ends of the upright members when the bridges are connected to the base members. Lateral movement of the loaded glass sheets is restricted using a first set of fasteners in connection with the arms. Front-to-back movement of the loaded glass sheets is restricted using a second set of fasteners in connection with the bridges.

In certain example embodiments, a method of shipping glass sheets is provided, with the method comprising having a plurality of racks according to loaded with glass sheets, with one or more first racks of the plurality of racks being positioned back-to-back with one or more counterpart second racks of the plurality of racks along a central longitudinal axis of a truck bed or rail car.

According to certain example embodiments, the racks may be loaded onto and/or unloaded from a truck bed or rail car. For instance, the glass sheets may be shipped via open rail car, with an area defined where upper ends of upright members of racks placed back-to-back serving as a central beam for the open rail car.

The features, aspects, advantages, and example embodiments described herein may be combined to realize yet further embodiments.

DETAILED DESCRIPTION

Certain example embodiments relate to racks for shipping loose or packaged glass sheets, with such racks being removable from the rail cars, trucks, or the like, that may be used to transport them. Certain example embodiments advantageously allow for the use of a standard center-beam rail car or truck, with the rack being loadable and unloadable from the rail car or truck by fork-truck or the like. The rack in some instances can take the place of the A-frame, and it can be put directly into a truck (or from a rail car to a truck), and then moved into the warehouse. It will be appreciated that smaller racks may be used with smaller glass sheets, e.g., for use with vans rather than or in addition to with trucks.

Figure 2:
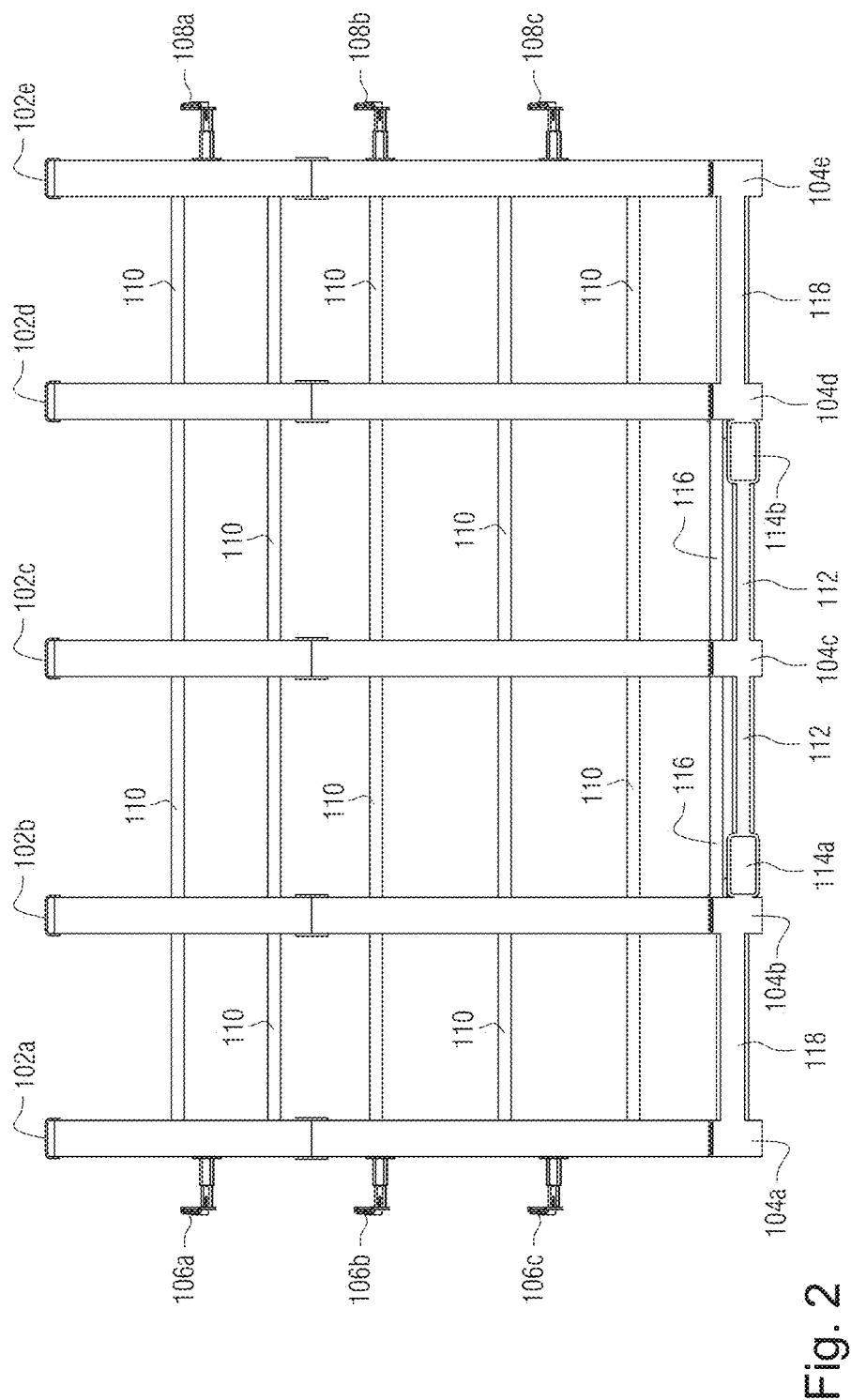
Figure 3:
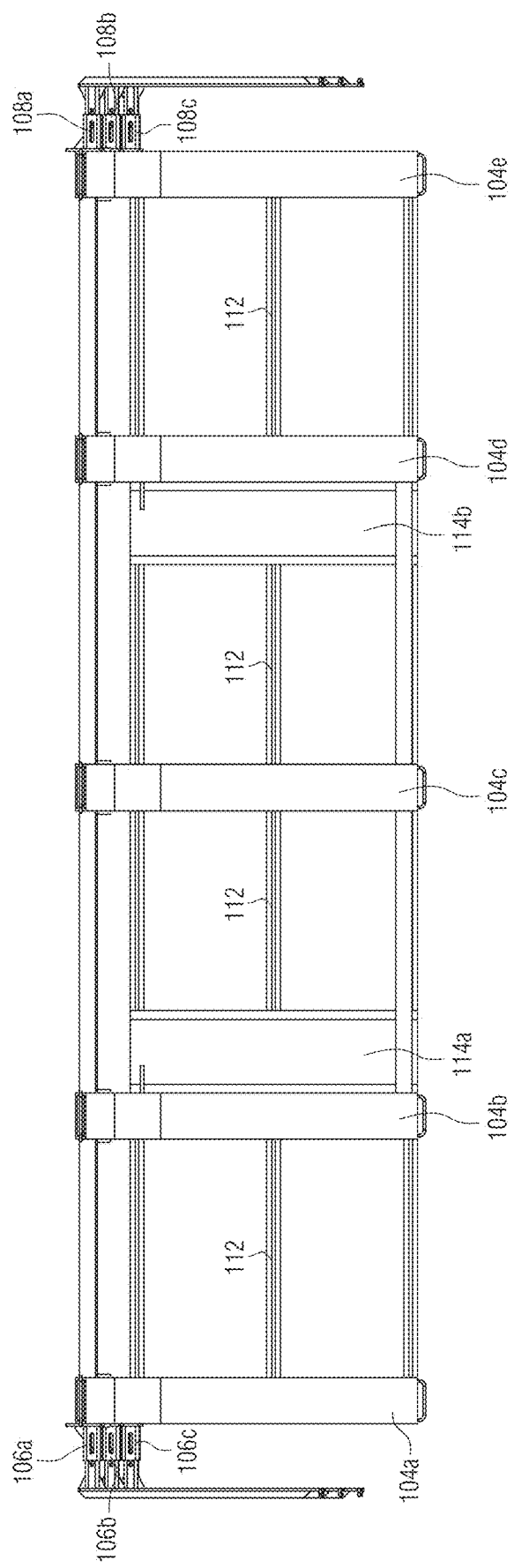
Figure 4:
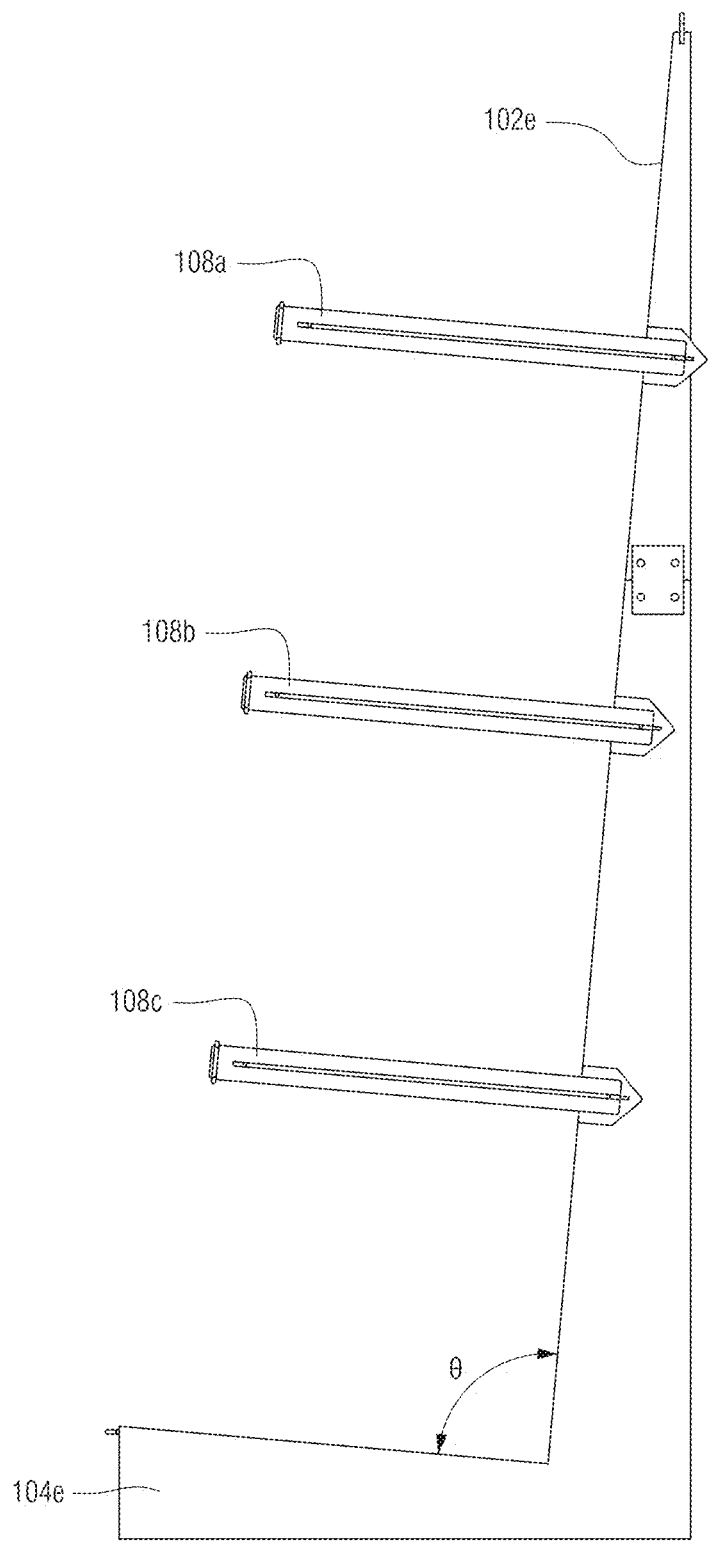
Figure 5:
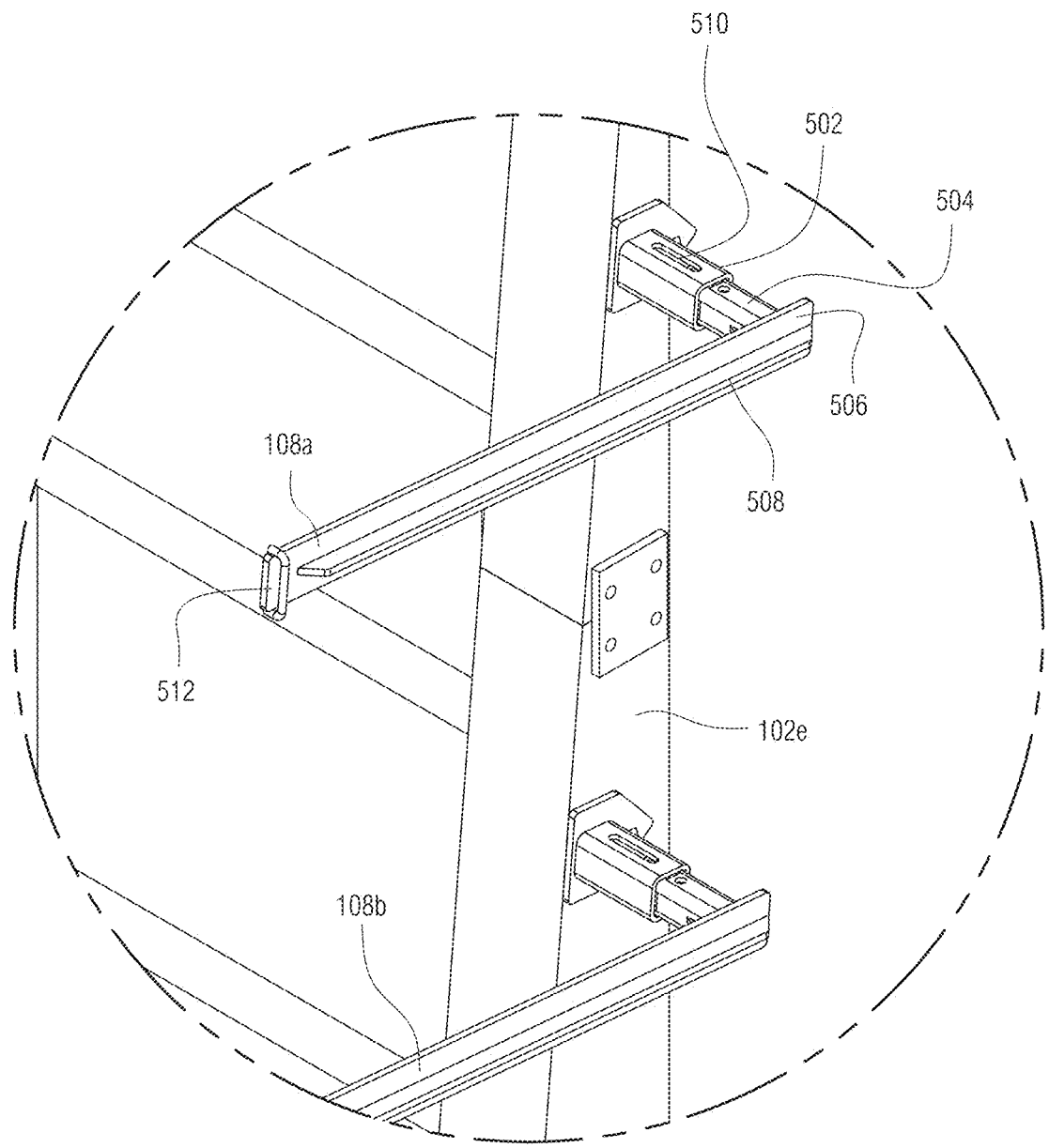

FIGS. 1-5 show a glass rack 100 in accordance with an example embodiment. The glass rack 100 shown in FIGS. 1-5 does not have any glass sheets loaded thereon. More particularly, FIG. 1 is a perspective view of a glass rack 100 in accordance with an example embodiment. FIG. 2 is a front elevation view of the glass rack 100 of FIG. 1. FIG. 3 is a top plan view of the glass rack 100 of FIG. 1. FIG. 4 is a right side view of the glass rack 100 of FIG. 1, the left side being a mirror image thereof in at least certain example embodiments. FIG. 5 is an enlargement of the area shown in FIG. 1.

As will be appreciated from FIGS. 1-5, an individual rack 100 according to certain example embodiments may resemble an L-frame rack. However, as will become clearer from the description of the drawings that follows, two racks can be arranged "back-to-back" to create an A-frame like arrangement, where glass sheets can be loaded on both sides of the central upright. Referring once again to FIGS. 1-5, it can be seen that the example rack 100 includes a plurality of upright members 102a-102e, respectively connected to a plurality of base members 104a-104e, the latter of which extend generally perpendicularly from the bottoms of the former.

Arms 106a-106c are provided at the left end of the rack 100 and are connected to the leftmost upright member 102a, and arms 108a-108c are provided at the right end of the rack 100 and are connected to the rightmost upright member 102e. The left and right arms 106a-106c, 108a-108c in certain example embodiments may extend outwardly in a first direction parallel to the back edge of the rack 100, e.g., to help facilitate differently sized sheets, and then may extend in a direction in line with the base members 104a-104e to help hold the sheets in place relative to the rack 100. This arrangement also may be useful, as glass sheets may be more easily loaded onto a rack 100 with the arms 106a-106c, 108a-108c spaced apart and then held in place more securely by moving the arms 106a-106c, 108a-108c inwardly, towards the center upright member 102c. In certain example embodiments, the arms 106a-106c, 108a-108c may additionally or alternatively telescope inwardly and outwardly in a second direction perpendicular to the back edge of the rack 100 (and in a direction in line with the base members 104a-104e), e.g., to help facilitate different numbers of sheets that may be provided on the rack. In certain example embodiments, the arms 106a-106c, 108a-108c may pivot in place of or in addition to being able to translate in the first and/or second directions. When the arms 106a-106c, 108a-108c translate and/or rotate, they may be locked in place for transit and/or storage purposes using any suitable locking mechanism such as, for example, bolts and screws, biased members that extend through through-holes, etc.

As shown perhaps best in FIG. 4, the base of the rack 100 and the upright support are both angled/tapered. That is, the upright members 102a-102e each are wider at their base members 104a-104e, with each of the upright members 102a-102e and base members 104a-104e in essence forming right triangles, with the rearmost edge of the rack 100 being perpendicular to the ground, with the upright members 102a-102e tapering moving upwardly and away from their respective base members 104a-104e, and with the base members 104a-104e being thicker moving away from where they meet with their respective upright members 102a-102e. An angle $\theta$ therefore is formed proximate to where the upright members 102a-102e and their respective base members 104a-104e meet. This angled arrangement, which involves an acute or right angle $\theta$, helps keep the glass sheets in place (e.g., from falling forwards or backwards). In certain example embodiments, the upright members 102a-102e and base members 104a-104e are formed integrally with one another; in certain other example embodiments, the separate upright members 102a-102e and base members 104a-104e are connected to one another (e.g., via welding, bolting, and/or the like).

Rigid cross-beams 110 help maintain adjacent ones of the upright members 102a-102e in substantially parallel spaced apart relation to one another. These cross-beams 110 advantageously enable the rack 100 to be structurally sound while also decreasing the overall weight of the rack. In a similar manner, first rigid base beams 112 help maintain adjacent ones of the base members 104a-104e in substantially parallel spaced apart relation to one another. As mentioned above, fork trucks or the like may be used to move the rack 100. In this regard, tubular members 114a and 114b may be provided in the approximate center of the rack 100, e.g., on opposing sides of the central upright member 102c, and may be sized, shaped, and arranged to receive the forks thereof. Second rigid base beams 116 connecting the second and fourth base members 104b and 104d to the central base member 104c may be provided to lend further structural support to the rack 100 proximate to these tubular members 114a and 114b, and thicker third base beams 118 may be provided to connect along the outer sides of the rack 100.

As shown perhaps best in FIG. 3, in certain example embodiments, the left and right arms 106a-106c, 108a-108c are provided to different depths relative to the rack 100. In this example, the arms 106a-106c, 108a-108c are provided in line with the leading edge of the leftmost and rightmost upright members 102a, 102e, respectively, leading to the arms being angled relative to the ground and leading to the lower arms 106c and 108c protruding further from the back of the rack 100 than the upper arms 106a and 108a. This arrangement may be advantageous in certain example instances, e.g., in terms of helping to match the angle at which the sheets are placed in the rack 100 and enabling more secure attachment of those sheets to the rack.

FIG. 5 shows example features of the uppermost right arms 108a and 108b. In this example, the arms 108a-108b telescope inwardly and outwardly relative to the upright member 102e. In the FIG. 5 example, a female component 502 is welded, bolted, and/or otherwise secured to the upright member 102e and receives a male protrusion 504 that extends generally perpendicularly from the main portion 506 of the arm 108a (although it will be appreciated that this arrangement may be reversed in different example embodiments). A sliding mechanism 510 is provided to the female component 502, facilitating the outward telescoping movement. A bolt or other member may be used to secure the arm 108a in place relative to the upright member 102e. The main portion 506 of the arm 108a may include a protrusion 508 running along a substantial portion of its length. This protrusion 508 may facilitate the attachment of ropes, chains, belts, shrink wrap, or other materials to the rack 100, e.g., when trying to hold in place sheets provided thereto. In the FIG. 5 example, the main portion 506 of the arm 108a is hollow and includes a through-hole 512, which additionally or alternatively may facilitate the attachment of ropes, chains, ties, belts, and/or the like to the rack 100, e.g., when trying to hold in place sheets provided thereto. That is, rope, chains, and/or the like may be fed through the through-hole 512 of the arm 108a and fed through a corresponding through-hold of the matching arm 106a on the other side of the rack 100, e.g., to hold in place sheets provided to the rack 100. In certain example embodiments, such ropes, chains, ties, belts, and/or the like may be retractably secured to the rack 100 (e.g., in the arms).

Figure 6:
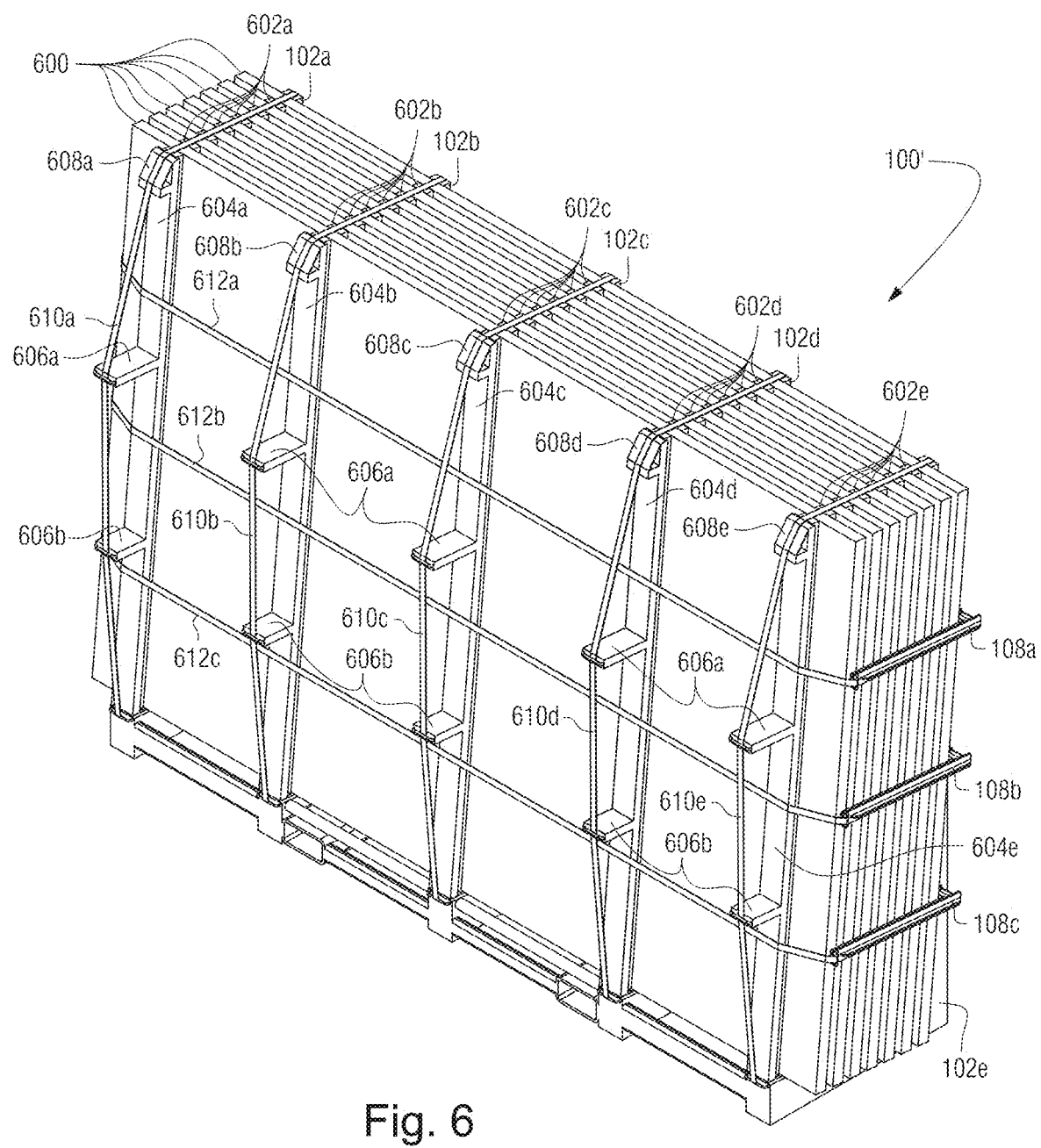
Figure 7:
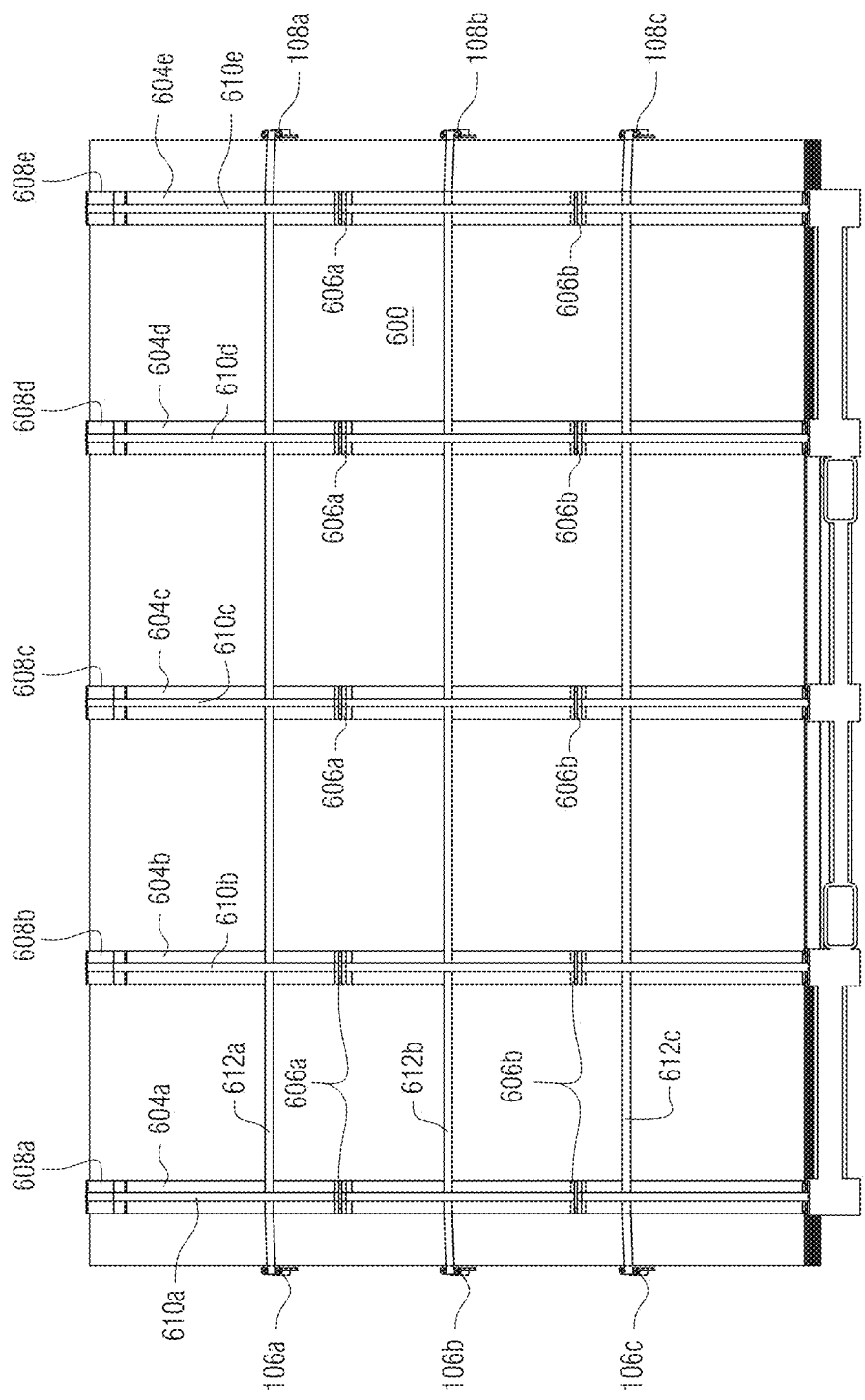
Figure 8:
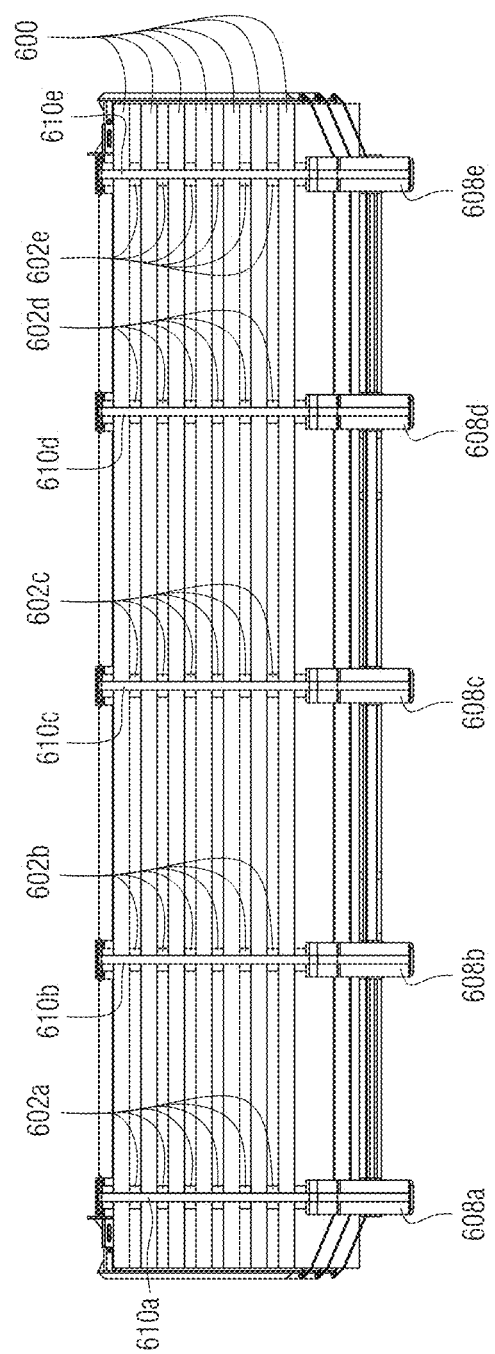
Figure 9:
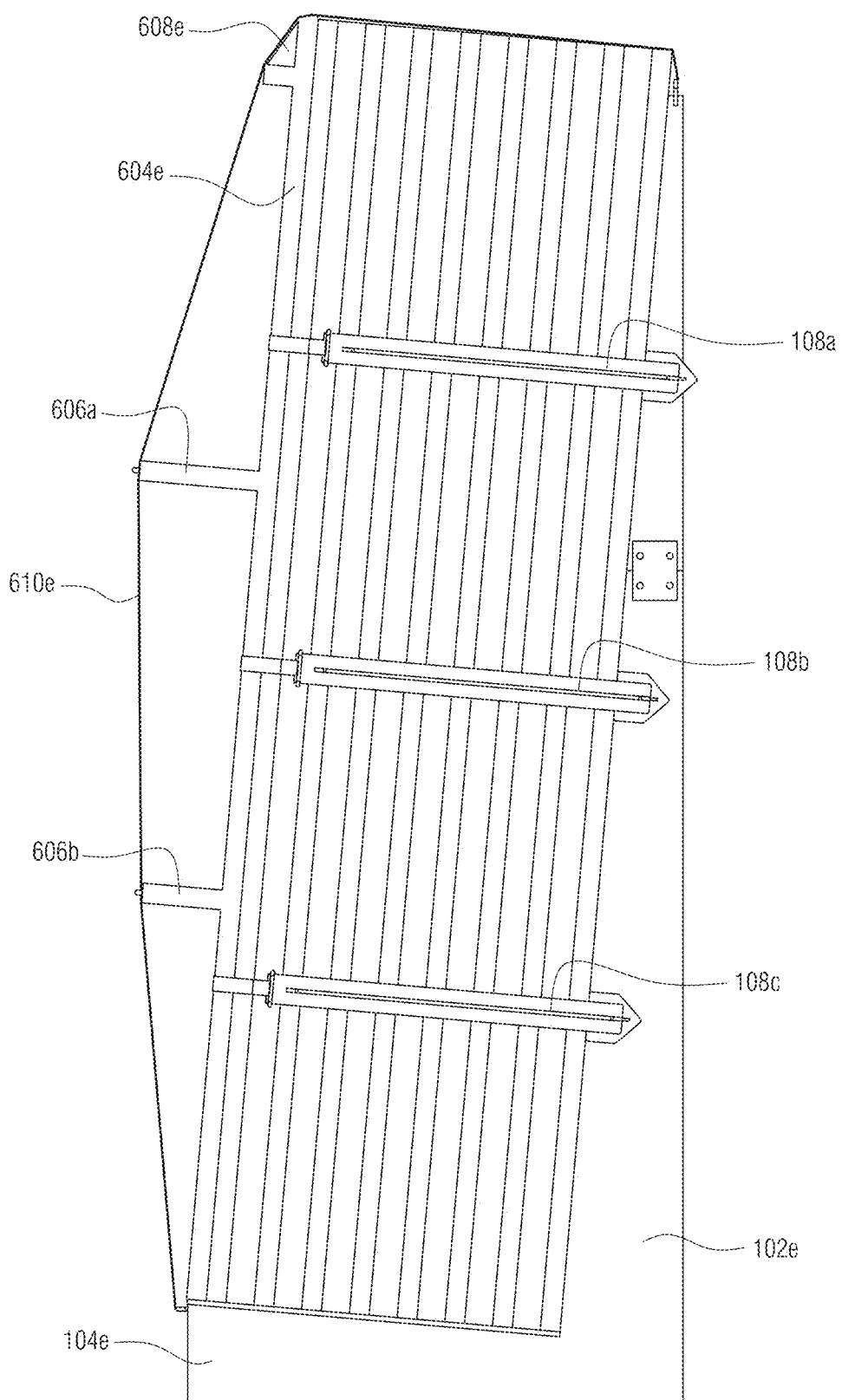

FIGS. 6-9 generally correspond to the glass rack shown in FIGS. 1-5, except that (for example) FIGS. 6-9 show a glass sheets 600 loaded on the glass rack 100'. FIG. 6 is a perspective view, FIG. 7 is a front elevation view, FIG. 8 is a top plan view, and FIG. 9 is a right side view.

As can be seen from FIGS. 6-9, upright spacers 602a-602e are provided between adjacent sheets 600. In this example, first upright spacers 602a are provided generally in line with the first upright member 102a, second upright spacers 602b are provided generally in line with the second upright member 102b, etc. The upright spacers 602a-602e may be sized and shaped to run the entire or nearly the entire height of the rack 100' and to maintain the angle(s) e created by the angled base and upright support. The upright spacers 602a-602b may be formed from any suitable material (e.g., a material unlikely to damage the glass but also resilient enough to withstand the pressure of adjacent glass sheets) such as, for example, wood, glass, plastic, urethane, cardboard, and/or the like. By being located generally in line with the upright members 102a-102e, the upright spacers 602a-602e are able to rest on upper surfaces of the base members 104a-104e, respectively. In certain example embodiments, the upright spacers 602a-602e may fit into gaps, slots, channels, recesses, holes, and/or other openings that are spaced apart from one another and formed in the base members 104a-104e, e.g., to facilitate their secure attachment in the rack 100'.

Upright bridges 604a-604e may be provided outside of the outermost glass sheet 600 provided to the rack 100'. These bridges 604a-604e also may be sized and shaped to run the entire or nearly the entire height of the rack 100' and to maintain the angle(s) e created by the angled base and upright support, and they may be formed from the same or different material compared to the upright spacers 602a-602e. As with the upright spacers 602a-602e, the upright bridges 604a-604e may be provided generally in line with the upright members 102a-102e.

The upright bridges 604a-604e may include one, two, three, or more projections along their lengths, and they may fit into gaps, slots, channels, recesses, holes, and/or other openings, provided at in the base of the rack 100'. The FIG. 6 example shows first and second sets of projections 606a and 606b being provided to the bridges 604a-604e, and they first and second sets of projections 606a and 606b have different extents in this example. One or more channels, pockets, recesses, holes, or the like may be provided to the base members 104a-104e, e.g., at the outer edges and/or at different distances corresponding to different depths provided by different numbers of glass sheets 600, upright members 102a-102e, upright spacers 602a-602e, and/or upright bridges 604a-604e.

The upright bridges 604a-604e also may include upper features 608a-608e, respectively. The projections 606a and 606b and upper features 608a-608e may facilitate straps, chains, ropes, or the like, that help hold the sheets in place. A first set of straps, chains, ropes, or the like 610a-610e, may directly contact these projections 606a and 606b and/or features 608a-608e and run around the front, bottom, rear, and top surfaces of the rack 100' (and/or sheets 600). A second set of straps, chains, ropes, or the like 612a-612c, may directly or indirectly contact these projections and/or features and run around the front, rear, and side surfaces of the rack (and/or sheets). The second set 612a-612c may be secured to the left and right arms 106a-106c and 108a-108c and/or run through holes formed therein (e.g., as described above in connection with FIG. 5) and in some cases will not contact the projections 606a and 606b or features 608a-608e of the upright bridges 604a-604e at all. See, e.g., FIG. 6 for an example of this general arrangement. The first set 610a-610e may run through holes or channels formed in the projections 606a and 606b, upper features 608a-608e, and/or upright members 102a-102e, in certain example embodiments. Again, see, e.g., FIG. 6 for an example of this general arrangement.

Although a certain number of glass sheets, spacers, upright bridges, upright members, strap/similar elements, etc., are shown in these and other drawings, it will be appreciated that more or fewer of these and/or other corresponding or related elements may be used in different example embodiments.

Figure 10:
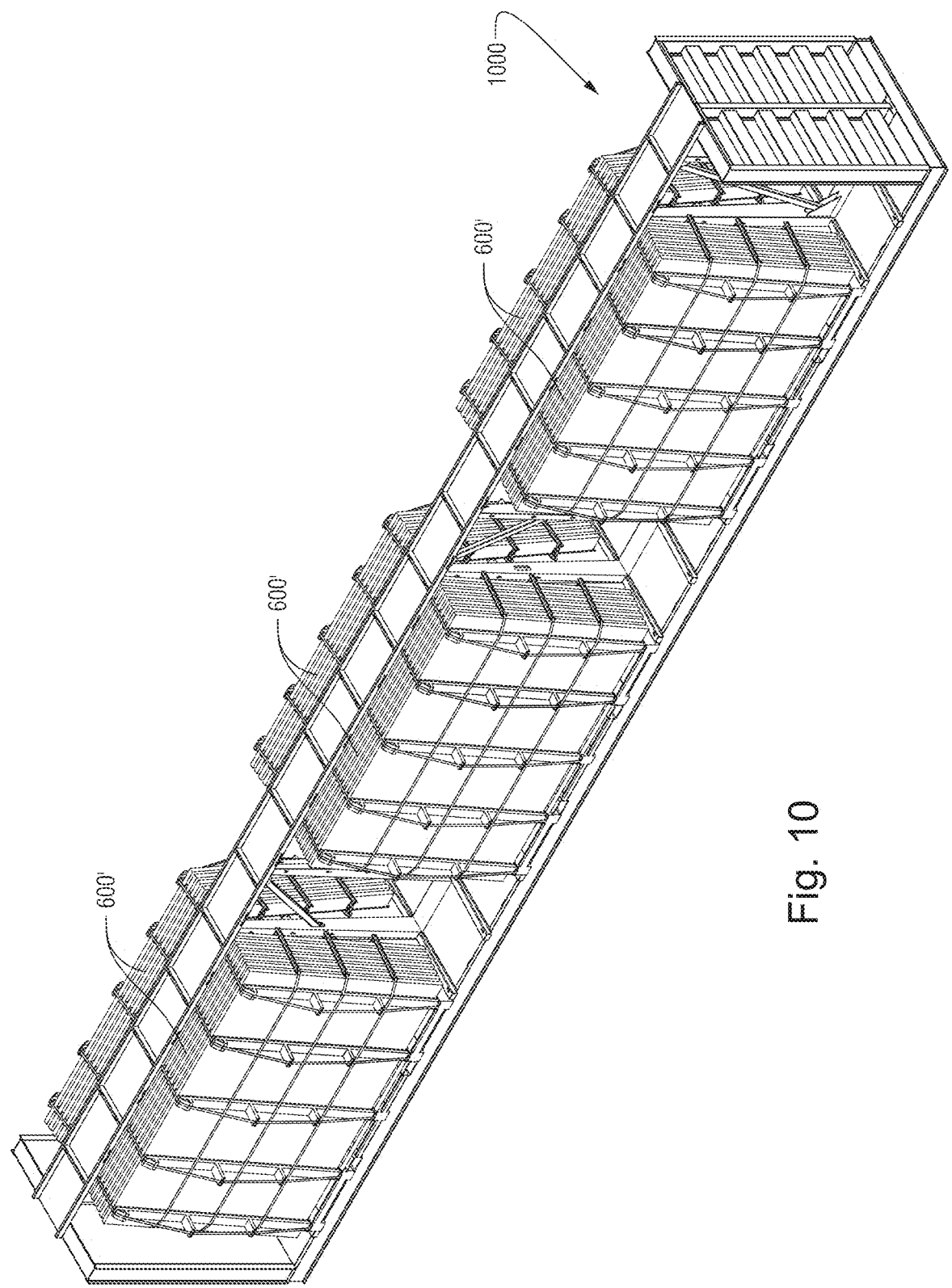
Figure 11:
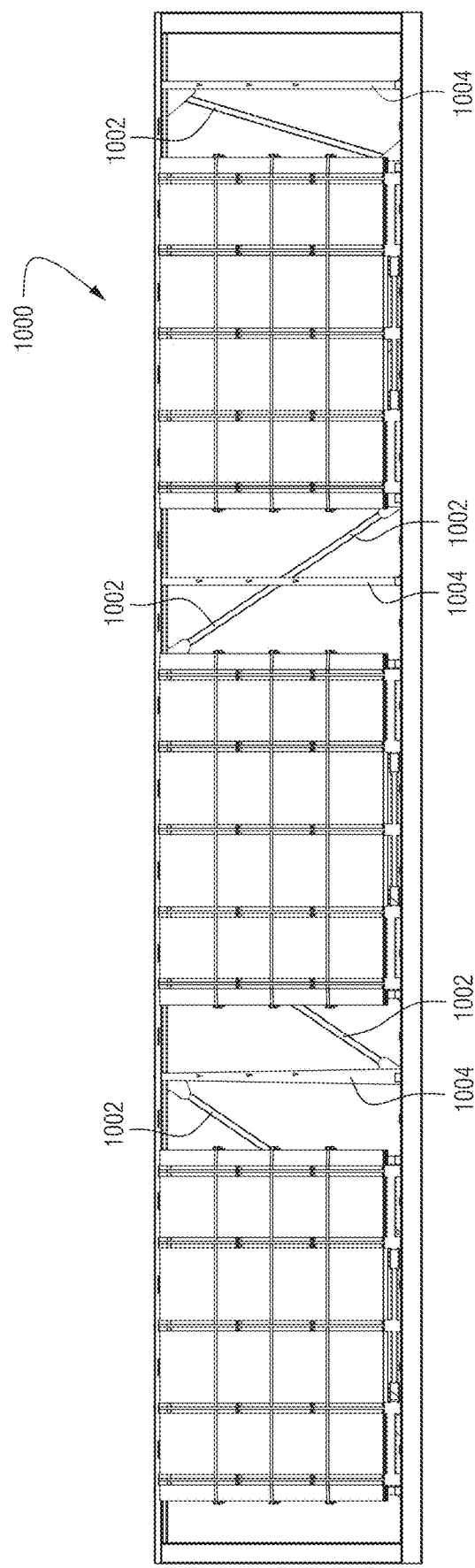

FIGS. 10-11 show how a plurality of racks 100' loaded with glass sheets in accordance with FIGS. 6-9, can be put on a standard rail car 1000. That is, FIG. 10 is a perspective view of a rail car 100 including a plurality of racks 100' loaded with glass sheets in accordance with FIGS. 6-9, and FIG. 11 is a side view of the rail car 1000 shown in FIG. 10.

The rail car 1000 itself may be open or closed. In some instances, it may be covered with a tarp or tenting material. As noted above, racks may be positioned back-to-back and may be self-supporting in this respect. This arrangement is shown perhaps best in FIG. 10. In this way, the rack (or combination of racks) in some instances can take the place of some conventional A-frame arrangements and can be used with a standard center beam rail car. The racks are also easily loadable and unloadable using forklifts, fork trucks, or the like, which may pick them up from either side of the rail car by engaging with slots or other features formed in the base, or by simply engaging with the rack by lifting it from under the base. The racks can be moved from the rail car 1000 to a destination or to a truck or other vehicle for further transportation purposes (e.g., a tuck of the type shown in FIG. 12).

As shown perhaps best in FIG. 11, cross beams 1002 or the like may extend from the top or bottom of the rail car 1000. Together with or apart from upright beams 1004, they may help hold the racks 100' in place. This may be facilitated by having such beams 1002 pivotably attached to the top and/or bottom of the rail car 1000, and/or the upright beams 1004, and enabling them to securely fasten to ends of the racks 100'.

Figure 12:
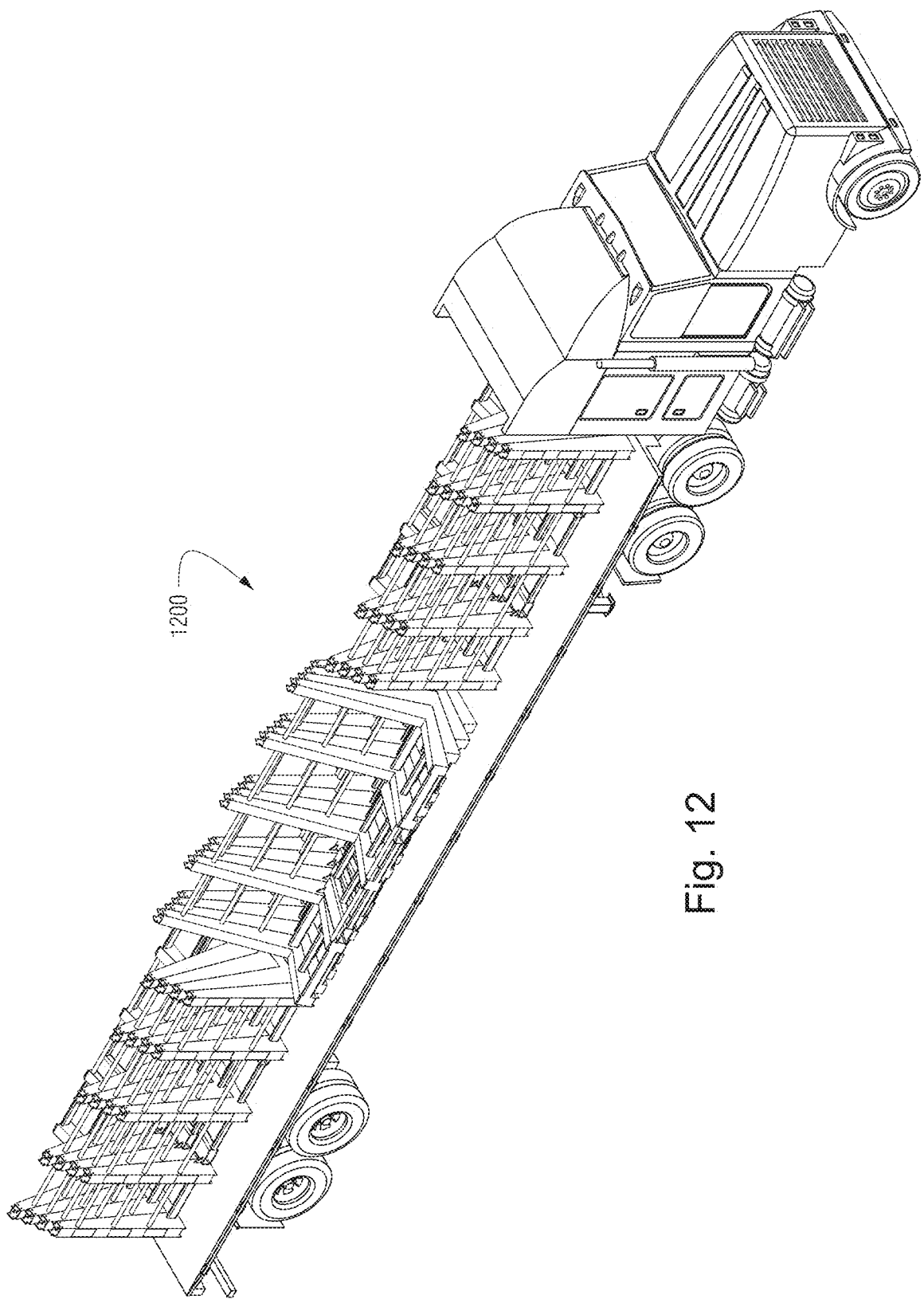
Figure 13:
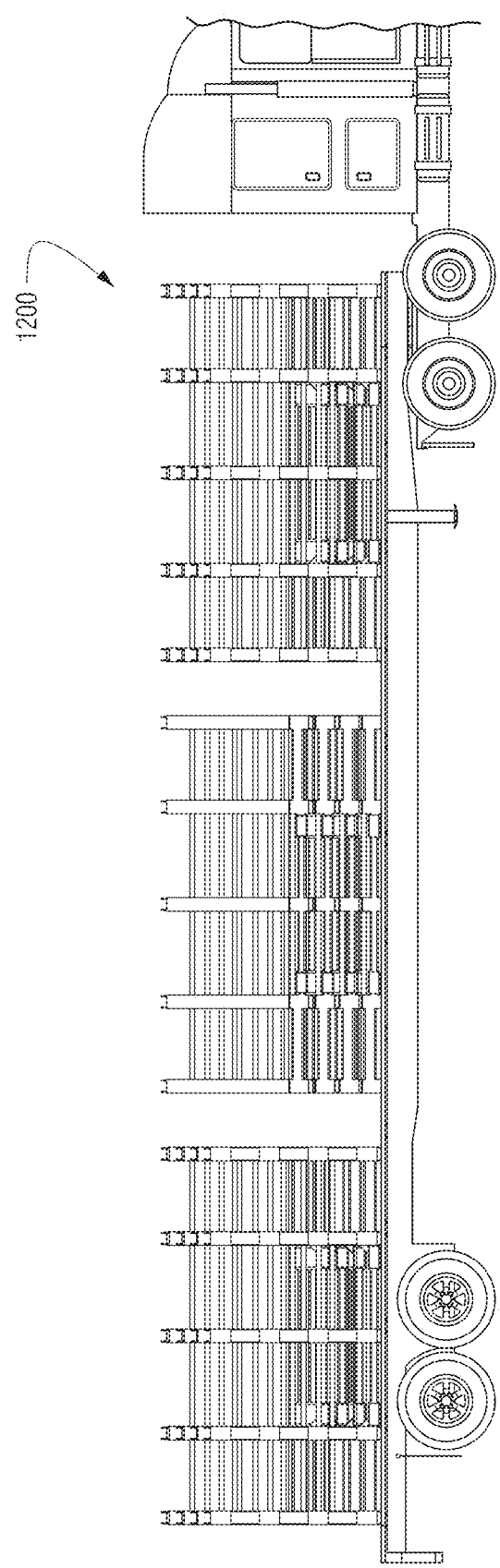

It will be appreciated that racks can be loaded onto open or closed trucks and/or other vehicles in a manner similar to that shown in and described in connection with FIGS. 10-11. In a somewhat related regard, FIGS. 12-13 show how a plurality of unloaded racks similar to those shown in and described in connection with FIGS. 1-5 can be stacked one on another and loaded on a truck 1200 for transport. That is, FIG. 12 is a perspective view, and FIG. 13 is a side view of the truck 1200 shown in FIG. 12. The arrangement shown in FIGS. 12-13, which involves subsequent stacks being rotated 180 degrees relative to each other progressing down the length of the truck bed, is advantageous, e.g., for balancing purposes. It will be appreciated that the angled base and upright support facilitate this stackable arrangement shown in these drawings.

Figure 14:
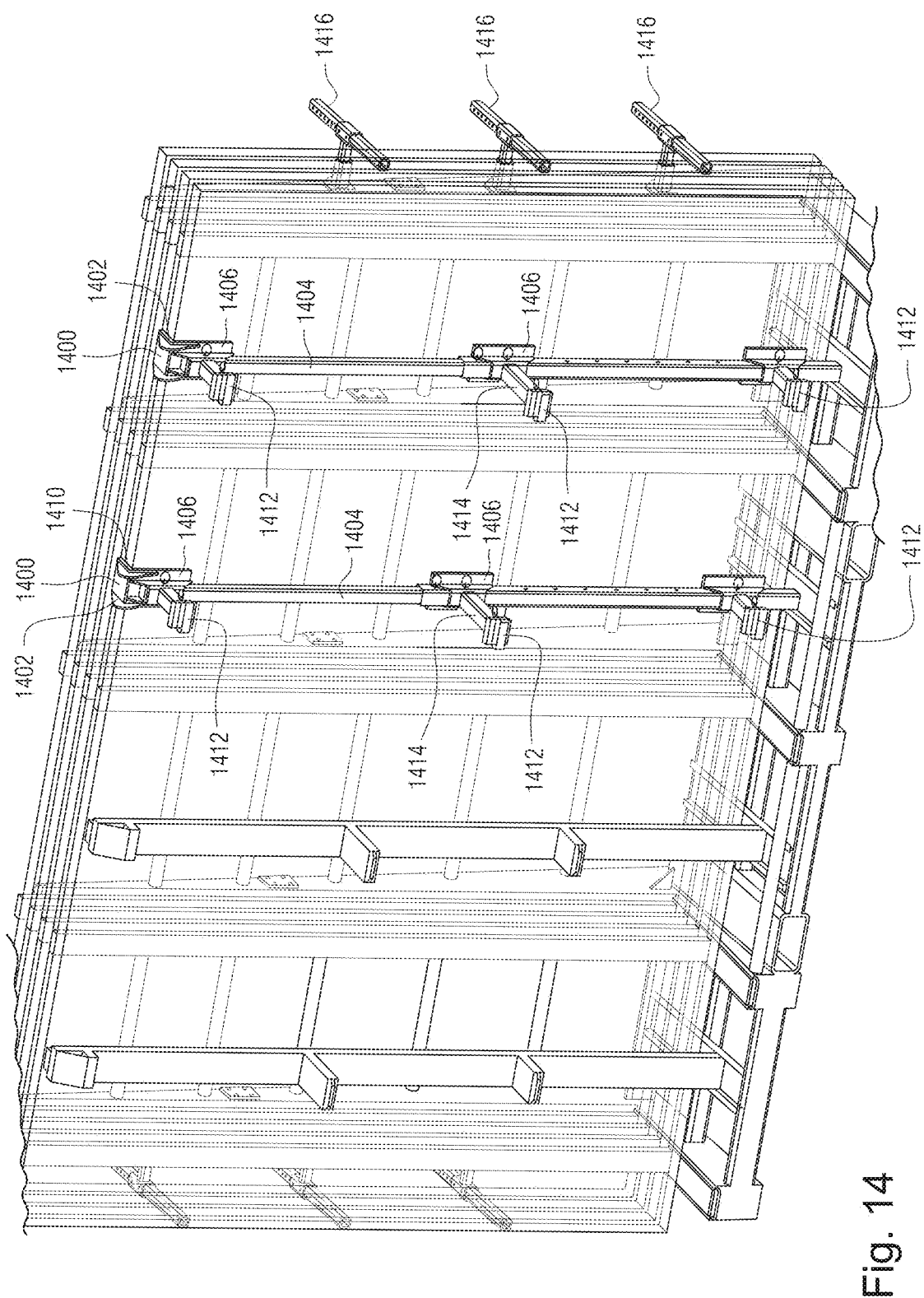
Figure 15:
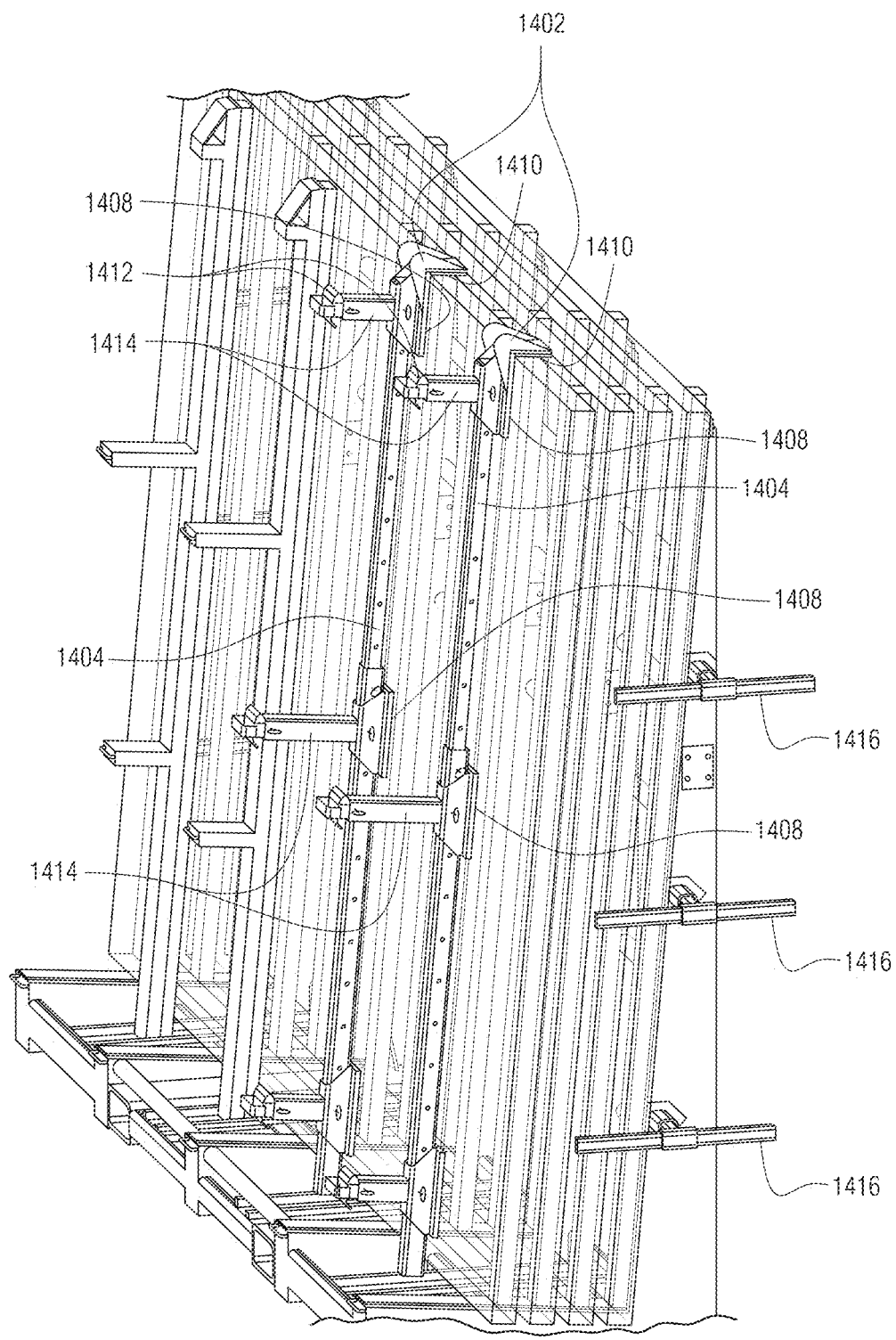

FIGS. 14-15 show of glass racks, shown in perspective views, in accordance with certain example embodiments. These views show alternative "bridge" concepts that may be used in place of, or together with, the bridges described above in connection with FIG. 6. These views show additional or alternative bridges 1400, which can be used in certain example embodiments. These different bridges 1400 may clamp to or otherwise form an at least partial lip over an upper edge of an outermost glass rack in certain example embodiments, e.g., using clamps 1402 or the like. Their main body portions 1404 may be narrower and potentially formed from a more robust material, as larger feet 1406 that have padded areas 1408 may engage more directly with the surface of the outermost glass sheet. The clamps 1402 additionally or alternatively may include padded areas 1410, in certain example embodiments. In addition, the strap or other features may be fed through holes or channels 1412 in projections 1414 thereon (although it is noted that this arrangement also may be used with the upright bridges discussed in greater detail above). The positioning of the projections 1414 may be adjusted, e.g., using preformed holes or other positioning means located on or in the main body portions 1404. The arms 1416 may extend forward and backward relative to the rear upright support of the rack. This may facilitate the connection between racks arranged back to back, and/or may provide for better connection locations for the strap or other features (e.g., as they be fed through holes and/or the like).

Figure 16:
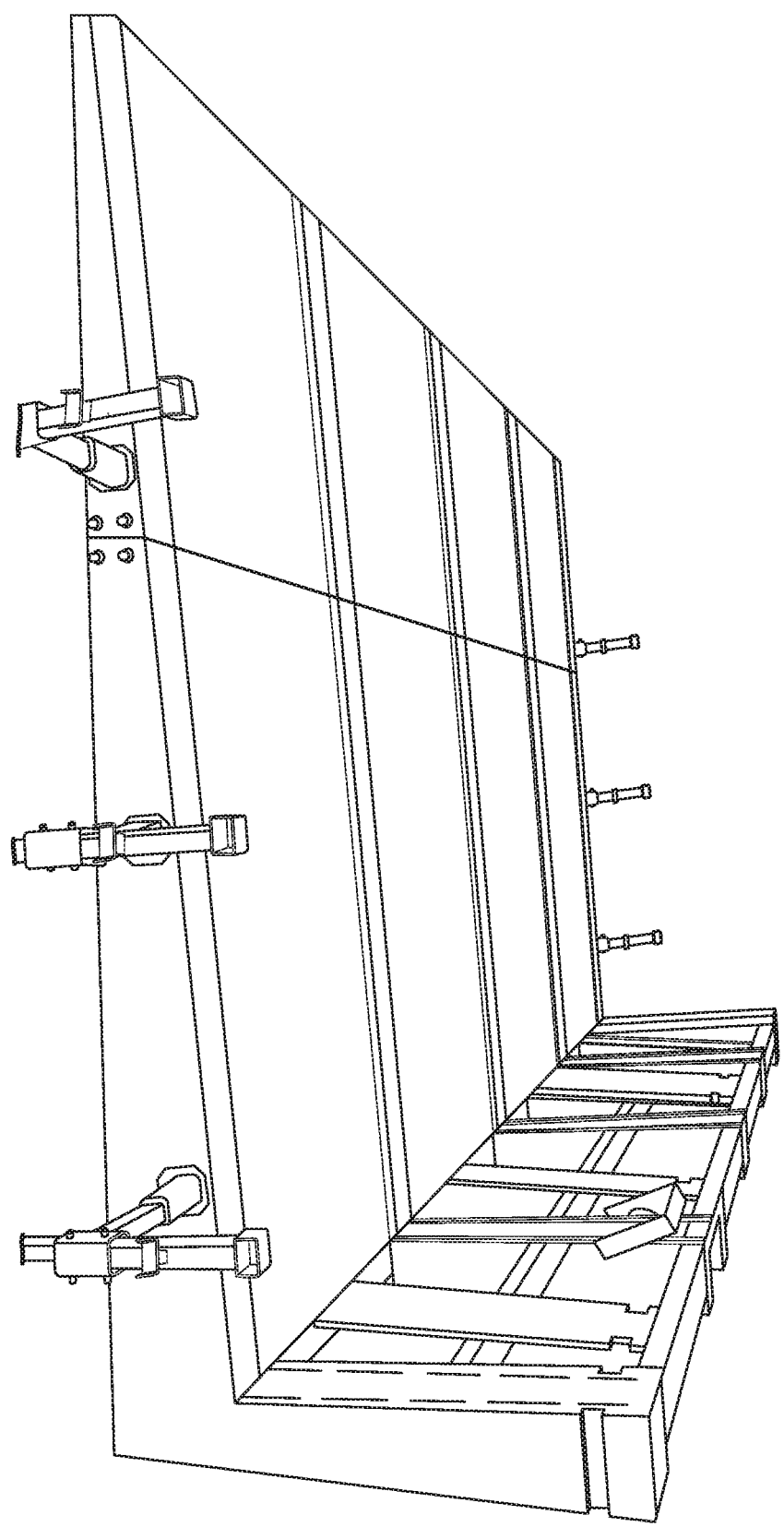
Figure 17:
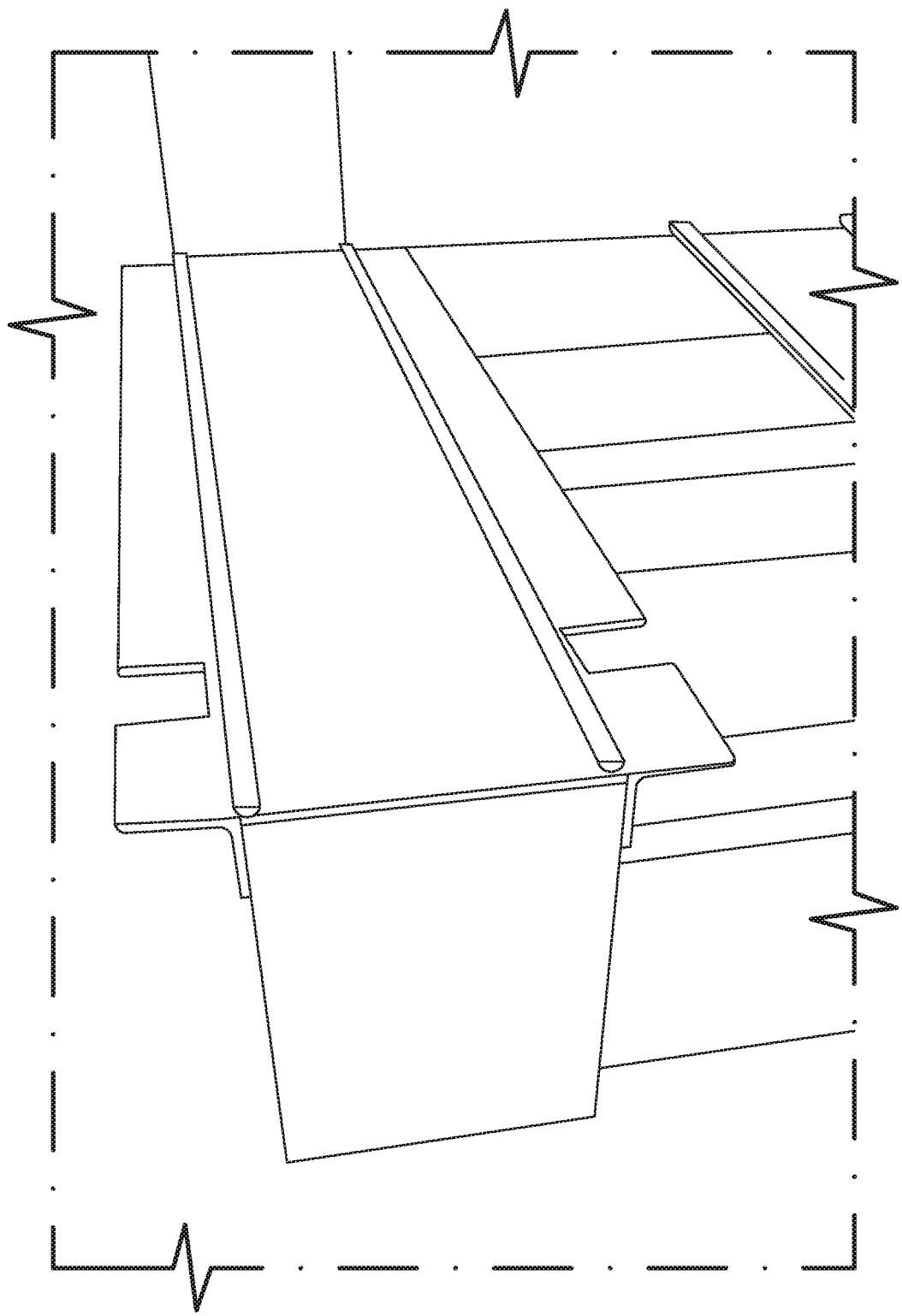
Figure 18:
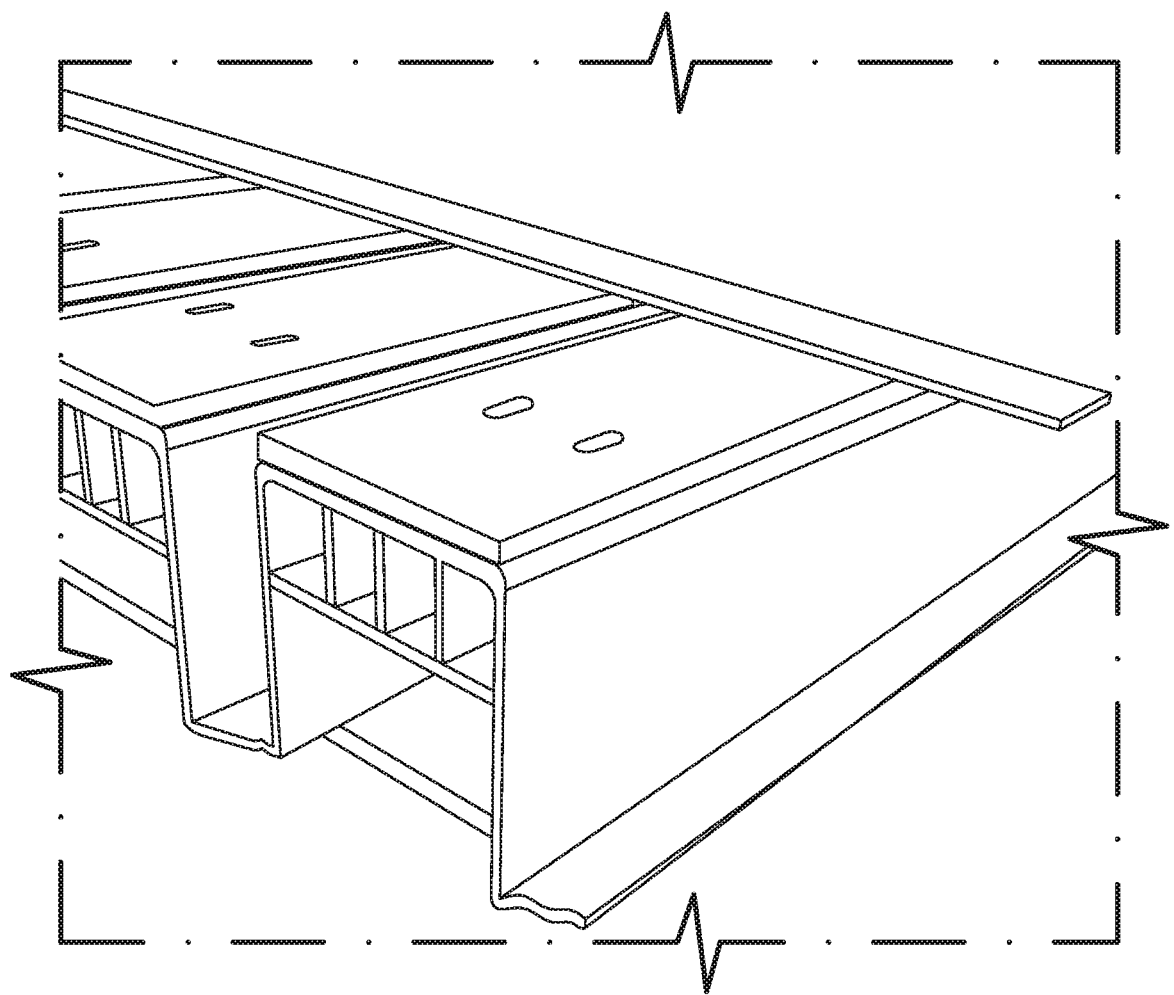

FIGS. 16-18 are images of a prototype rack in accordance with certain example embodiments.

In certain example embodiments, a rack adapted to hold a plurality of glass sheets is provided. A plurality of upright members are spaced apart from one another. Each of the upright members have upper and lower ends. The upright members are thicker at the respective lower ends compared to the respective upper ends and taper in thickness along a height direction. A plurality of base members extend outwardly and generally perpendicularly from respective upright members, the base members having a thickness that increases moving outwardly from the upright members so as to form an acute or right angle between innermost surfaces of the upright members and uppermost surfaces of the base members. The rack alone is self-standing as an L-frame rack, and the rack is arrangeable back-to-back with another rack of the same type to form a mutually-supporting A-frame rack.

In addition to the features of the previous paragraph, in certain example embodiments, first and second tubular members may be provided substantially in line with the base members and on opposing sides of a central axis of the rack, e.g., with the first and second tubular members being sized, shaped, and arranged to permit the rack to be moved by receiving forks from a forklift and/or fork truck.

In addition to the features of the previous paragraph, in certain example embodiments, the first and second tubular members may be substantially rectangular in cross section.

In addition to the features of any of the three previous paragraphs, in certain example embodiments, a plurality of cross-beams may be provided between adjacent ones of the upright members; and/or a plurality of base-beams may provided between adjacent ones of the base members.

In addition to the features of any of the four previous paragraphs, in certain example embodiments, first and second sets of arms may be provided to the outermost upright members, e.g., with the first and second sets of arms being positioned to reduce lateral movement of glass sheets provided to the rack.

In addition to the features of the previous paragraph, in certain example embodiments, the first and second sets of arms may be configured to telescope towards and away from one another to accommodate placement of glass sheets on the rack.

In addition to the features of either of the two previous paragraphs, in certain example embodiments, the first and second sets of arms may be configured to telescope towards and away from one another to accommodate differently sized glass sheets on the rack.

In certain example embodiments, a method of moving glass sheets is provided. The method includes having a rack of any of the seven previous paragraphs, e.g., a rack, including: a plurality of upright members that are spaced apart from one another, each of the upright members having upper and lower ends, the upright members being thicker at the respective lower ends compared to the respective upper ends and tapering in thickness along a height direction; a plurality of base members extending outwardly and generally perpendicularly from respective upright members, the base members having a thickness that increases moving outwardly from the upright members so as to form an acute or right angle between innermost surfaces of the upright members and uppermost surfaces of the base members; and first and second sets of arms provided to the outermost upright members, the first and second sets of arms being provided to reduce lateral movement of glass sheets provided to the rack. Glass sheets are loaded onto the rack. A plurality of bridges are placed on the rack, with the bridges at lower ends thereof engaging with respective base members of the rack outside an outermost glass sheet provided to the rack, and with the bridges, once placed, being generally parallel with the upright members and having upper ends extending to a height corresponding to upper ends of the upright members when the bridges are connected to the base members. Lateral movement of the loaded glass sheets is restricted using a first set of fasteners in connection with the arms. Front-to-back movement of the loaded glass sheets is restricted using a second set of fasteners in connection with the bridges. In a similar manner, certain example embodiments provide a method of shipping glass sheets, with the method comprising having a plurality of racks according to any of the seven previous paragraphs loaded with the glass sheets, and with one or more first racks of the plurality of racks being positioned back-to-back with one or more counterpart second racks of the plurality of racks along a central longitudinal axis of a truck bed or rail car.

In addition to the features of the previous paragraphs, in certain example embodiments, the rack alone may be self-standing as an L-frame rack, and the rack may be arrangeable back-to-back with another rack of the same type to form a mutually-supporting A-frame rack.

In addition to the features of either of the two previous paragraphs, in certain example embodiments, the first and second sets of fasteners may include belts.

In addition to the features of any of the three previous paragraphs, in certain example embodiments, forks from forklift and/or fork truck are inserted into first and second tubular members provided substantially in line with the base members and on opposing sides of a central axis of the rack; and the rack is picked up and moved with the forklift and/or fork truck.

In addition to the features of any of the four previous paragraphs, in certain example embodiments, the racks are loaded onto the truck bed or rail car and/or unloaded from the truck bed or rail car. Similarly, in addition to the features of any of the four previous paragraphs, in certain example embodiments, the glass sheets may be shipped via open rail car, with an area defined where upper ends of upright members of racks placed back-to-back serving as a central beam for the open rail car.

In certain example embodiments, a kit is provided. A rack adapted to hold a plurality of glass sheets comprises a plurality of upright members that are spaced apart from one another, with each of the upright members having upper and lower ends, and with the upright members being thicker at the respective lower ends compared to the respective upper ends and tapering in thickness along a height direction; and a plurality of base members extending outwardly and generally perpendicularly from respective upright members, with the base members having a thickness that increases moving outwardly from the upright members so as to form an acute or right angle between innermost surfaces of the upright members and uppermost surfaces of the base members. A plurality of bridges are connectable at lower ends thereof to respective base members of the rack outside an outermost glass sheet provided to the rack, with the bridges being arrangeable generally in parallel with the upright members and having upper ends extending to a height corresponding to upper ends of the upright members when the bridges are connected to the base members. The rack alone may be self-standing as an L-frame rack, and the rack may be arrangeable back-to-back with another rack of the same type to form a mutually-supporting A-frame rack.

In addition to the features of the previous paragraph, in certain example embodiments, the bridges may be engagable with openings in and/or grooves of the base members of the rack.

In addition to the features of either of the two previous paragraphs, in certain example embodiments, the bridges may be configured to engage with outer lips of the base members of the rack.

In addition to the features of any of the three previous paragraphs, in certain example embodiments, the bridges may each include a plurality of projections extending outwardly therefrom.

In addition to the features of the previous paragraph, in certain example embodiments, a first hole or channel may be provided to each projections.

In addition to the features of the previous paragraph, in certain example embodiments, a plurality of first fasteners may be feedable through the first holes or channels, e.g., to help reduce forward and backward movement of glass sheets provided to the rack.

In addition to the features of the previous paragraph, in certain example embodiments, first and second sets of arms may be provided to the outermost upright members, e.g., with the first and second sets of arms being positioned to reduce lateral movement of glass sheets provided to the rack.

In addition to the features of the previous paragraph, in certain example embodiments, a second hole or channel may be provided to each arm.

In addition to the features of the previous paragraph, in certain example embodiments, a plurality of second fasteners may be feedable through the second holes or channels, e.g., to help reduce lateral movement of glass sheets provided to the rack.

In addition to the features of any of the nine previous paragraphs, in certain example embodiments, first and second sets of arms may be provided to the outermost upright members, e.g., with the first and second sets of arms being positioned to reduce lateral movement of glass sheets provided to the rack.

In addition to the features of any of the 10 previous paragraphs, in certain example embodiments, a plurality of spacers may be providable between adjacent glass sheets.

In addition to the features of any of the 11 previous paragraphs, in certain example embodiments, the bridges may include clamps at the upper ends thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rack configured to hold a plurality of glass sheets, the rack comprising:
   a plurality of upright members, each of the upright members comprising an upper end and a lower end, the upright members being thicker at the respective lower ends compared to the respective upper ends, so that the upright members are thinner upwardly away from the ground;
   wherein rear surfaces of the respective upright members which are opposite surfaces that are to support the glass sheets are configured to remain perpendicular to the ground and perpendicular to bottom surfaces of a plurality of base members throughout lengths of the upright members;
   the plurality of base members extending outwardly and generally perpendicularly from respective upright members, the base members having a thickness that increases moving outwardly from the upright members so as to form an acute or right angle between innermost surfaces of the upright members and uppermost surfaces of the base members; and wherein the rack is configured to be arrangeable back-to-back with another rack of the same type to form a mutually-supporting A-frame rack.

2. The rack of claim 1, further comprising first and second tubular members provided substantially in line with the base members and on opposing sides of a central axis of the rack, the first and second tubular members being sized, shaped, and arranged to permit the rack to be moved by receiving forks from at least one of a forklift or fork truck.

3. The rack of claim 2, wherein the first and second tubular members are substantially rectangular in cross section.

4. The rack of claim 1, further comprising a plurality of cross-beams provided between adjacent ones of the upright members, and a plurality of base-beams provided between adjacent ones of the base members.

5. The rack of claim 1, further comprising first and second sets of telescopic arms attached to respective upright members, the first and second sets of telescopic arms being configured to reduce lateral movement of glass sheets on the rack.

6. The rack of claim 5, wherein the first and second sets of arms are configured to telescope towards and away from one another to accommodate placement of glass sheets on the rack.

7. The rack of claim 5, wherein the first and second sets of arms are configured to telescope towards and away from one another to accommodate differently sized glass sheets on the rack.

* * * * *